2,812,418

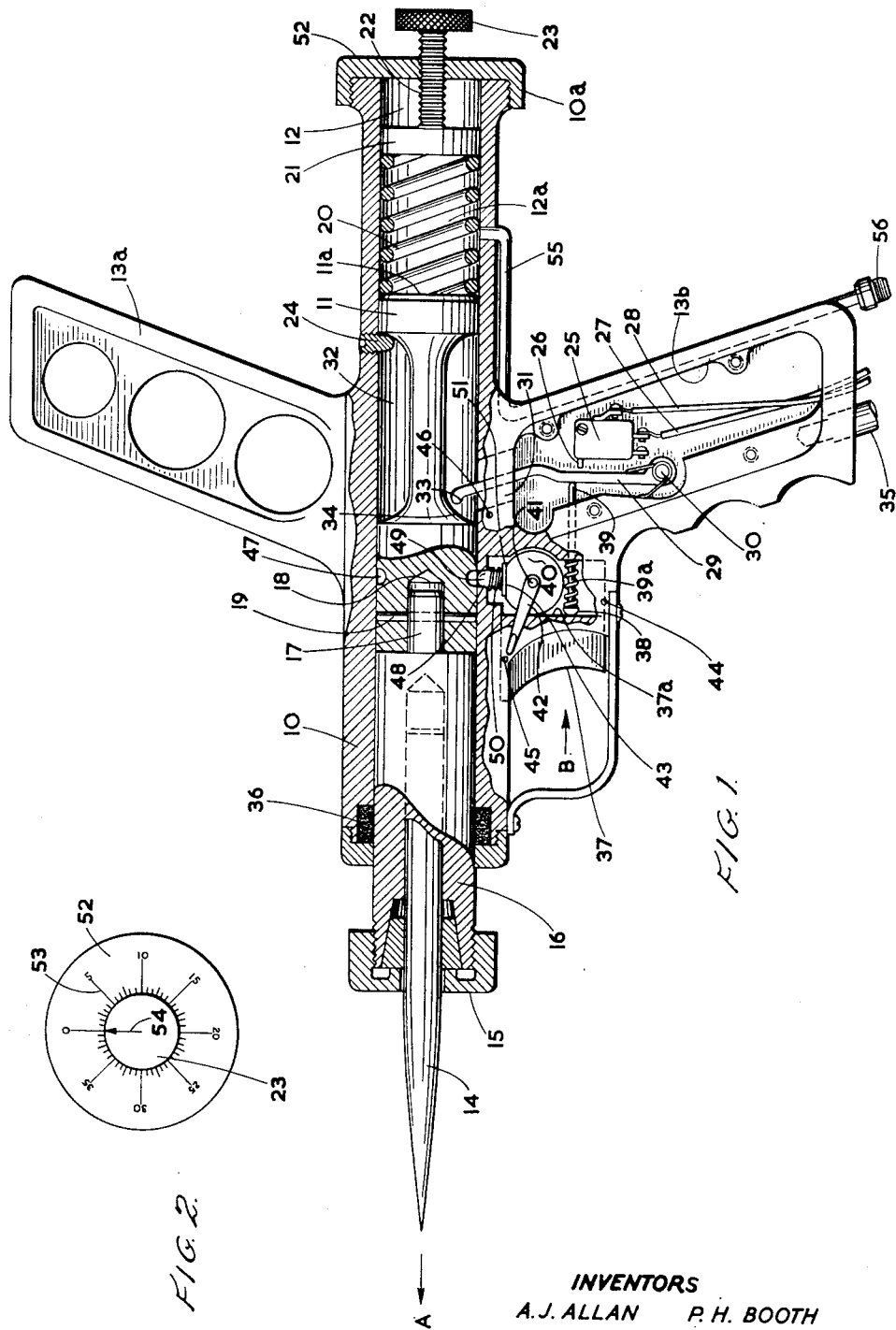
Nov. 5, 1957 A. J. ALLAN ET AL 2,812,418
PORTABLE RESISTANCE WELDING GUN
Filed Sept. 10, 1956
INVENTORS
A. J. ALLAN   P. H. BOOTH
BY: Maybee & Legris
ATTORNEYS

United States Patent Office 2,812,418
Patented Nov. 5, 1957

PORTABLE RESISTANCE WELDING GUN

Alexander John Allan, Don Mills, Ontario, and Peter Harry Booth, Rexdale, Ontario, Canada, assignors to Orenda Engines Limited, Village of Malton, Ontario, Canada, a corporation Application September 10, 1956, Serial No. 608,904

10 Claims. (Cl. 219—86)

This invention relates to welding devices and in particular to electric resistance spot welding devices of the "gun" type.

In the manufacture of aircraft it is often found necessary to spot weld parts together without taking them to a welding jig. The welding of struts or plates to frame members which are already fixed to the airframe, for example, must be done on the job and for this purpose resistance spot welding "guns" are often employed since they are portable and easy to manipulate by the workman in the cramped quarters which are often encountered.

The present invention relates to a welding gun which has a number of advantages over the welding guns which are in common use at the present time as will more fully appear hereinafter.

In some types of welding operations it is essential that the welding electrode of the gun be applied to the member which is to be welded with a predetermined pressure to urge the two parts which are to be welded together into intimate contact so that the weld will take place in a satisfactory manner. In other types of operations it is not necessary that any predetermined amount of pressure be applied, the amount of pressure used being unimportant.

Accordingly it is one object of this invention to provide a portable welding gun in which means are provided to ensure that the welding gun will not be energized until the electrode is applied to the workpiece with the desired pressure. Means are then provided for the automatic "firing" of the gun when this pressure is reached.

It is also an object of this invention to provide a welding gun which may be adjusted so that the gun will not "fire" when the pressure is reached or even exceeded until a separate firing mechanism is manually operated by the workman. Means are also provided to lock both the pressure sensitive firing means and the manually operable firing means so that the gun cannot be fired accidentally under any circumstances.

Other objects and advantages of the present invention will become apparent from a consideration of the following description of the invention which, in its preferred embodiment, comprises a plunger mounted for sliding movement relative to a guide member and biased in one direction, the plunger being adapted to carry an electrode extending in the direction of the bias, a switch fixed on the guide member for connecting the welding device to a source of electric current, means carried by the plunger to engage a member extending into its path of movement against the bias to actuate the switch, a trigger movable against a bias to actuate the switch and means to render selectively the plunger and the trigger inoperative to actuate the switch.

Referring now to the accompanying drawings in which the preferred embodiment of the invention is illustrated:

Figure 1 is a side elevation of the welding gun partly cut away and partly in section, and Figure 2 is an end view of the guide member of Figure 1.

Referring now to the drawings in detail it will be seen that the gun comprises generally a cylindrical barrel which constitutes a guide member 10 for a slidable plunger 11 which is mounted within the bore 12 of the guide member 10. Handles 13a and 13b extend from the guide member 10, one on each side thereof to enable the gun to be conveniently gripped by both hands of a workman.

The welding electrode 14 is carried in a collet 15 at one end of a copper or brass ferrule 16 which is a sliding fit within the bore 12 of the guide member 10. The end of the ferrule 16 remote from the electrode 14 is provided with an axially extending pin 17 which fits within a bore 18 in the substantially cylindrical plunger 11 and is held therein by means of a cross pin 19 which passes through the end of the plunger 11 and a suitable hole through the axial pin 17.

A spring 20 bears at one end against the face 11a of the plunger 11 and, at the other end, against disc 21 to bias the plunger, ferrule and electrode out of the barrel in the direction of the arrow A in the drawing. The disc 21 is mounted on the end of a threaded bolt 22 which is engaged by a threaded hole in end cap 10a and which, at its other end, carries a knurled knob 23 so that the disc 21 may be adjusted relative to the guide member 10 to increase or decrease the force exerted by the spring on the plunger 11 by advancing or retracting the bolt 22 relative to the cap 10a. A stop 24 comprising a grub screw threaded into an aperture in the guide member prevents the slidable assembly consisting of the ferrule 16 and the plunger 11 from moving out of the bore of the guide member.

Handle 13b extending from the guide member 10 of the gun is hollow and contains therein an electric switch 25 of the "micro-switch" type which is provided with an actuating button 26. Leads 27 and 28 go from the switch 25 to the source of electric current for the gun to energize the gun when the actuating button 26 of the switch 25 is depressed.

An arm 29 is pivotally mounted at 30 and extends past the button 26 through an aperture 31 in the cylindrical wall of the guide member into an annular recess 32 formed in the plunger 11. The end 33 of the arm 29 is in a position to be contacted by shoulder 34 of the plunger 11 if it is moved against the bias of the spring 20. Accordingly, it will now be seen that if a workman gripping the handles 13a and 13b of the gun presses the electrode 14 against the workpiece, the ferrule 16 and the plunger 11 will move into the guide member against the bias of spring 20 and the shoulder 34 carried by the plunger will contact the arm 29 which extends into its path of movement against the bias and will move it to the right in Figure 1 thereby causing it to bear against the actuating button 26 of switch 25 to actuate the switch which energizes the gun.

The energization of the gun is obtained through an electric cable 35 which is in electrical connection with the handle 13b. There is no insulation between the electrode 14 and the handle 13b, the electric current from cable 35 flowing through the metallic parts of the gun to a carbon bushing 36 which is in intimate electrical contact with the copper or brass ferrule 16 which, by means of the collett 15 holds the electrode 14.

In addition to this means of energizing the gun a trigger 37 is slidably mounted on the guide member 10 adjacent the point of juncture between handle 13b and the guide member 10 and, when urged in the direction of the arrow B by the workman's finger, is adapted to engage the head 38 of a pin 39 which is spring loaded against the trigger in a direction opposite to that of the arrow B. The end of the pin 39 remote from the head 38 is adapted to bear against the arm 29, and, accordingly, movement of the trigger 37 in the direction of the arrow B will cause the pin 39 to bear against arm 29 to move it into engagement with the actuating button 26 of the switch 25 to energize the gun.

Behind the trigger 37 is a cam 40 which is rotatably mounted relative to the guide member 10 by means of shaft 41. The cam 40 is, however, fixed on shaft 41 as is a lever 42 which is mounted on that portion of shaft 41 which extends beyond the guide member 10 in which it is journalled. The cam 40 is generally circular in its planar cross-section and is provided with a flattened portion 43.

As can be seen from Figure 1 the lever 42 is adapted to occupy one of three possible positions indicated by reference characters 44, 45 and 46. An annular groove 47 is provided in the plunger 11 in a position such that when the plunger 11 is in abutment with the stop 24 as shown in Figure 1 the annular groove 47 is aligned with a hole 48 in the cylindrical wall of the guide member 10. A pin 49 is adapted to have one end within this hole 48 and to bear at its other end against the surface of the cam 40, a spring 50 bearing at one end against the wall of the guide member 10 and at the other end against a radially extending flange 51 on the pin 49 to urge it into intimate contact with the cam 40.

Accordingly, from Figure 1 it will be seen that when the lever 42 is in the position indicated in Figure 1 the flat portion 43 of the cam 40 lies immediately beneath the pin 49 and, accordingly, the spring 50 urges the pin 49 out of engagement with the annular groove 47 in the plunger and the plunger is free to move against the bias under the influence of pressure applied by the workman. At the same time the circular surface of the remainder of the cam 40 is in close abutment with the rear face 37a of the trigger 37 and effectively locks it in position. Accordingly, the only method of firing the gun is by imposing a pressure upon the electrode 14 which will cause the plunger 11 to move further into the guide member so that the shoulder 34 carried by the plunger 11 will contact the arm 29 to cause it to move into engagement with the operating button 26 of the switch 25.

If, however, the lever 42 is moved from the position adjacent point 45 to a position adjacent point 44 the circular surface of the cam will cause the pin 49 to move upwardly in Figure 1 into the annular groove 47 thereby locking the plunger and the electrode in position relative to the guide member 10 so that no movement between these two parts can take place. At the same time the flat portion 43 moves until it is adjacent the rear face 37a of the trigger 37 and thus enables the trigger to move in the direction of the arrow B under the influence of pressure applied by the workman's finger. This will cause the movement of the pin 39 towards the switch 25 which will cause the arm 29 to move into engagement with the operating button 26 of the switch and will energize the gun. In this condition the only method of energizing the gun is by actuating the trigger 37 since the plunger 11 is fixed relative to the guide member.

The third alternative position of the lever 42 is indicated by the reference character 46 and when the lever is in this position the cam 40 will have been rotated so that the circular portion of its surface is in contact both with the rear face 37a of the trigger and the radially extending flange 51 of the pin 49 so that both the plunger and the trigger are locked relative to the guide member 10 and, accordingly, there is no means whereby the switch 25 may be actuated and the gun cannot be fired accidentally.

Depending upon the type of welding operation which is to be done the pressure which the operator may wish to impose upon the workpiece will vary and towards this end the knurled knob 23 and the threaded bolt 22 may be rotated to advance or retract the disc 21 relative to the end face 11a of the plunger 11. In order to enable the operator to set the spring pressure against the plunger to a predetermined value the end face 52 of the guide member 10 is provided with a series of graduations 53 against which a pointer 54 on the end of knurled knob 23 may be set. Accordingly, if the operator knows that when the pointer 54 is set at zero graduation on end face 52 the pressure is at a predetermined value, he may increase or decrease this pressure by rotating the knurled knob 23 in a clockwise or counterclockwise direction as the case may be. Thus it is also a simple matter to reset the spring pressure to a previous setting.

Similarly, if the operator desires to be able to energize the gun upon immediate contact of the electrode with the workpiece he will move the lever 42 to the position indicated by reference character 44 so that the gun may be fired by pulling the trigger as soon as the electrode touches the workpiece. Alternatively if he wishes to impose a pressure greater than that which could be obtained with the maximum setting of spring pressure he may also lock the plunger relative to the guide member so that an unlimited pressure may be applied before the gun is fired by pulling the trigger.

As an alternative construction to that shown in Figure 1 the spring 20 may be removed from the guide member 1 and the pressure imposed upon the end face of plunger 11 applied by means of compressed air which may be fed to the chamber 12a formed between the end face 11a of the plunger 11 and the disc 21 within the bore 12 of the guide member 10. This compressed air may be supplied to the chamber 12a by means of conduit 55 which lies within the handle 13a and which is provided at its free end with a male coupling 56 for simple connection to a source of compressed air. It will be appreciated, of course, that when compressed air is used the remaining operation of the welding device is identical to that which has been described in connection with the embodiment which contains the spring.

From the above description of the invention it will be appreciated that a welding gun has been invented in which automatic means are provided for "firing" the gun when the electrode is engaging the work with a predetermined pressure. Also means have been provided whereby the gun can be fired at the discretion of the operator regardless of the pressure by means of the trigger and means are provided to render selectively either the pressure sensitive means or the trigger means operative at will.

The embodiment of the invention illustrated in the drawings and described in this specification is not to be construed as limiting the invention in any way but is to be considered as a convenient embodiment in which the features of the invention may be achieved to their best advantage. Minor modifications in the construction and arrangement of parts may be made within the spirit of the invention and the scope of the appended claims.

What we claim as our invention is:

1. An electric welding device comprising a plunger mounted for sliding movement relative to a guide member and biased in one direction, the plunger being adapted to carry an electrode extending in the direction of the bias, a switch fixed on the guide member for connecting the welding device to a source of electric current, means carried by the plunger to engage a member extending into its path of movement against the bias to actuate the switch, a trigger movable against a bias to actuate the switch and means to render selectively the plunger and the trigger inoperative to actuate the switch.

2. An electric welding device comprising a plunger mounted for sliding movement relative to a guide member and biased in one direction against a stop, the plunger being adapted to carry an electrode extending in the direction of the bias, a switch fixed on the guide member connecting the welding device to a source of electric current, means carried by the plunger to engage a member extending into its path of movement against the bias to actuate the switch, a trigger movable against a bias to actuate the switch and means to render selectively the plunger and the trigger inoperative to actuate the switch.

3. An electric welding device comprising a plunger mounted for sliding movement relative to a body and biased in one direction against a stop, a switch stationary relative to the plunger for connecting the electrode to a source of electric current, means carried by the plunger to engage a member extending into its path when the plunger is moved against the bias, the member being adapted to actuate the switch, a trigger movable against a bias to actuate the switch and means to engage selectively the plunger and the trigger to render one of them inoperative to actuate the switch.

4. An electric welding device comprising a plunger mounted for sliding movement relative to a guide member and biased in one direction against a stop, the plunger being adapted to carry an electrode extending parallel to and in the direction of the bias, a normally open switch mounted on the guide member, means carried by the plunger to engage a member extending into its path when it is moved against the bias, the member, upon engagement with the plunger being adapted to actuate the switch to connect the electrode to a source of power, a trigger movable against a bias to actuate the switch and means to engage selectively the plunger and the trigger to render one of them inoperative to actuate the switch.

5. An electric welding device comprising a plunger mounted for sliding movement in a barrel and biased out of the barrel against a stop, the plunger being adapted to carry an electrode extending parallel to and in the direction of the bias, a normally open switch mounted on the guide member, means carried by the plunger to engage a member extending into its path when it is moved into the barrel against the bias, a member upon engagement with the plunger being adapted to actuate the switch and connect the electrode to a source of power, a trigger movable against a bias to actuate the switch and means to engage selectively the plunger and the trigger to render one of them inoperative to actuate the switch.

6. An electric welding device comprising a plunger mounted for sliding movement relative to a guide member and biased in one direction against a stop, the plunger being adapted to carry an electrode extending parallel to and in the direction of the bias, a normally open switch mounted on the guide member, a recess in the plunger, an arm pivoted at one end and extending adjacent the switch into the recess, the arm, upon engagement with the end of the recess when the plunger is moved against the bias being adapted to actuate the switch to connect the electrode to a source of power, a trigger movable against a bias to actuate the switch and means to engage selectively the plunger and the trigger to render one of them inoperative to actuate the switch.

7. An electric welding device comprising a plunger mounted for sliding movement relative to a body and biased in one direction against a stop, the plunger being adapted to carry an electrode extending parallel to its path of sliding movement, a switch stationary relative to the body for connecting the electrode to a source of electric current, means carried by the plunger to engage a member extending into its path when the plunger is moved against the bias, the member being adapted to actuate the switch, a trigger movable against a bias to actuate the switch, a plunger stop movable between a first position in which it locks the plunger relatively to the body and a second position in which the plunger is movable relatively to the body and rotatable cam means to engage selectively the plunger stop and the trigger to render one of the plunger and the trigger inoperative to actuate the switch.

8. An electric welding device comprising a plunger mounted for sliding movement relative to a body and biased in one direction against a stop, the plunger being adapted to carry an electrode extending parallel to its path of sliding movement, a switch stationary relative to the body for connecting the electrode to a source of electric current, means carried by the plunger to engage a member extending into its path when the plunger is moved against the bias, the member being adapted to actuate the switch, a trigger movable against a bias to actuate the switch, a plunger stop movable between a first position in which it locks the plunger relatively to the body and a second position in which the plunger is movable relatively to the body and a rotatable cam movable from a first position engaging the plunger stop and rendering the plunger inoperative to actuate the switch to a second position in which it engages the trigger to render the trigger inoperative to actuate the switch and to a third position in which it engages both the plunger stop and the trigger to render both the plunger and the trigger inoperative to actuate the switch.

9. An electric welding device as claimed in claim 3 in which the means to engage the plunger includes a cam rotatably mounted adjacent the plunger, the plunger having an annular groove around its periphery, a pin movable through an aperture in the guide member under the influence of the cam to extend into the annular groove in the surface of the plunger to lock it in position relative to the guide member.

10. An electric welding device as claimed in claim 3 in which the means to engage the trigger includes a cam mounted for rotation in the path of the trigger, the cam being movable from a first position wherein its surface is in close abutment with the trigger thereby preventing movement thereof to a second position wherein its surface is spaced from the trigger thereby permitting the trigger to move.

References Cited in the file of this patent

UNITED STATES PATENTS

| | | |
|---|---|---|
| 1,589,977 | Lucas | June 22, 1926 |
| 1,712,261 | Farley | May 7, 1929 |
| 2,155,413 | Eckman | Apr. 25, 1939 |
| 2,179,326 | Eckman | Nov. 7, 1939 |
| 2,245,920 | Jardine et al. | June 17, 1941 |